United States Patent [19]

Zinter

[11] 4,091,568
[45] May 30, 1978

[54] GRASS PRODUCT AND METHOD OF MANUFACTURING THE SAME

[75] Inventor: Donald George Zinter, Rochester, N.Y.

[73] Assignee: High Point Mills, Inc., Henrietta, N.Y.

[21] Appl. No.: 711,089

[22] Filed: Aug. 2, 1976

[51] Int. Cl.² ............................................. A01G 1/00
[52] U.S. Cl. ......................................... 47/58; 47/56; 111/1; 111/DIG. 1
[58] Field of Search ..................... 47/58, 56, 1; 111/1, 111/DIG. 1

[56] References Cited

U.S. PATENT DOCUMENTS

| | | | |
|---|---|---|---|
| 3,863,388 | 2/1975 | Loads | 47/56 |
| 3,980,029 | 9/1976 | Huggett | 111/1 |

FOREIGN PATENT DOCUMENTS

| | | | |
|---|---|---|---|
| 2,055,733 | 5/1972 | Germany | 47/56 |
| 2,348,876 | 4/1974 | Germany | 47/56 |

Primary Examiner—Robert E. Bagwill
Attorney, Agent, or Firm—Cumpston & Shaw

[57] ABSTRACT

A grass product that is substantially protected against or free from insect infestation as by certain soil grubs or the like and method for manufacturing the same. The grass product may be manufactured as sod or grassland and cut into suitable units to be transported and used as a covering for lawns, terraces and the like previously prepared to accept them. Alternately, the grass product may be manufactured on top of existing sod such as in a lawn. The grass product comprises an upper layer of rooting material, a lower layer of sod or rooting material containing grass roots and/or seeds, and a nondegradable screen of a predetermined mesh size interposed between the upper and lower layers. The screen has a predetermined mesh size which prevents insects larger than the mesh from passing from the upper layer into the lower layer and vice versa. The grass blades existing in the sod or formed by germination of the seeds travel upwardly through the screen and upper layer, and the grass roots travel downwardly into the lower layer to form the grass product. Since the roots are below the screen, any insects larger than the mesh size are prevented from passing from the upper layer into the lower layer to eat the roots or to lay eggs which subsequently hatch as root-feeding larvae, and residual insects in the sod are prevented from passing through the screen to the surface of the upper layer.

4 Claims, 2 Drawing Figures

GRASS PRODUCT AND METHOD OF MANUFACTURING THE SAME

BACKGROUND OF THE INVENTION

1. Field of the Invention

This invention relates to a plant bed such as grassland or sod having means for protecting the roots of the plants from the feeding damage by the larval stage of certain insects, such as the European Chafer and the Japanese Beetle. More specifically, this invention relates to a grass product and method for manufacturing the same, which is substantially protected or free from feeding damage by the larval stage of certain insects.

2. Description of the Prior Art

It is known in the art, of which U.S. Pat. No. 2,605,589 is exemplary, to provide a grass bearing lamina to be used as a covering for lawns, terraces and the like. To facilitate transportation of units of the lamina, grass seed is planted in rooting material above a plastic mesh, and the materials of the lamina are held together by the grass roots of the germinated seed which become embedded in the plastic mesh.

U.S. Pat. No. 1,971,504 discloses a seed product comprising a layer of water-soluble fertilizer, and upper layer containing seeds and a flexible plastic material interposed between the fertilizer and seeds to keep the acidity of the fertilizer from adversely affecting the seeds. U.S. Pat. No. 3,812,618 discloses a seed-foam-fabric composite in which the seeds are disposed in particle portions of foam which are attached to the upper surface of a fabric backing.

U.S. Pat. No. 3,863,388 discloses a multi-layer grass unit in which an impervious barrier is positioned at the bottom of the unit, a mesh unit is located on or slightly above the impervious barrier, grass seed is placed on or slightly above the impervious barrier, and rooting material placed over the mesh and seed. Upon germination of the seeds, the grass roots cannot pass through the impervious layer and hence move laterally and then upwardly through the mesh openings to bind the seeds, screen and rooting material together in such a fashion that they can be separated as a unit from the impervious layer or barrier. The grass unit can then be transferred to a lawn or the like where the grass will then continue to grow with the roots now moving downwardly through the mesh and into the soil.

A disadvantage common to all of the aforementioned grass products is that the roots of the germinated grass seeds are mostly above the screen or mesh and hence the screen would not be effective in preventing insects such as grubs in the upper layer from attacking the grass roots and killing the grass.

SUMMARY OF THE INVENTION

In accordance with the preferred embodiment of the invention, an improved grass product is disclosed in which the grass roots are substantially protected or free from insect infestation such as by grubs or the like. While the invention is disclosed as primarily adapted for use with grass products such as lawns, it can be used with any plant product having sufficiently small blades or stalks, and the term "grass product" as used herein will be understood to include other similar plants having the above-described characteristics.

The grass product comprises an upper layer of rooting material, a lower layer of sod or rooting material containing grass roots and/or seeds, and a nondegradable or nondeteriorative screen of a predetermined mesh size interposed between the upper and lower layers of rooting material. The screen prevents insects or grubs larger than the predetermined mesh size from passing from the upper layer into the lower layer and vice versa. As used herein, the term "insect" includes the mature flying stage as well as the larval or grub stage of the insect. Although the invention is particularly adapted for protecting plants such as grass from attack by insects such as European Chafer and the Japanese Beetle, which are prevalent in certain areas of the United States, the invention is also effective against other insects which either in the mature flying or larval stages feed on plant roots.

The grass blades existing in the sod or formed by germination of the seeds travel upwardly through the screen and the upper layer, and the grass roots travel downwardly into the lower layer to form the grass product of this invention. Since the grass roots are below the lower surface of the screen, insects in the upper layer larger than the predetermined mesh size are prevented by the screen from attacking the roots or from laying eggs in the lower level, which subsequently hatch as root-feeding larvae. In a more specific embodiment, the predetermined mesh size of the screen ranges from substantially ⅛ to ¼ inch.

The invention further discloses a method for manufacturing the improved grass product using a lower layer of existing sod or other rooting material containing grass roots and/or seeds. The lower layer is covered with a screen having a predetermined mesh size, and an upper layer of rooting material is distributed over the screen. The grass blades in the existing sod or formed by germination of the seeds travel upwardly through the screen and upper layer, and the grass roots travel downwardly into the lower layer in a direction away from the screen to form the grass product of this invention. The primary advantage of this grass product is its protection against subsequent infestation by insects that feed on the roots of the grass. The invention and this and other advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Figure 1:
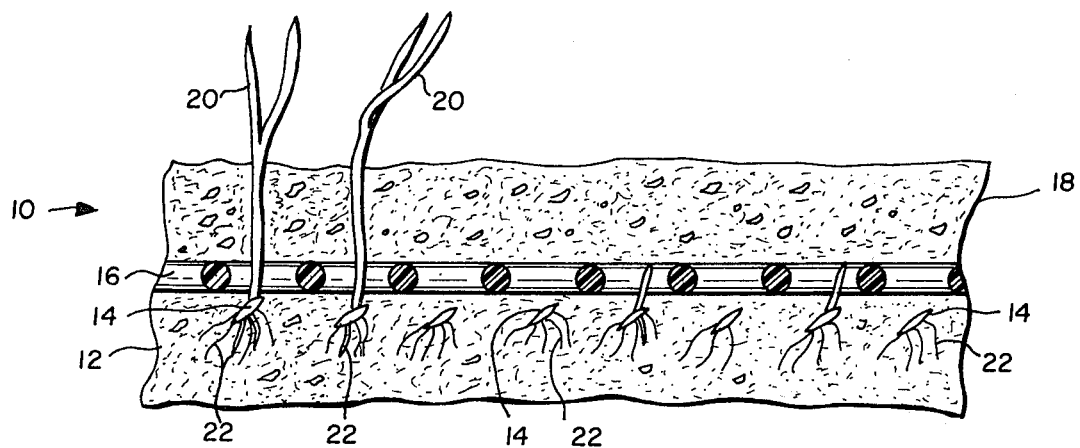
FIG. 1 is a cross sectional view of a preferred embodiment of the grass product of this invention with the screen shown on an enlarged scale.
Figure 2:
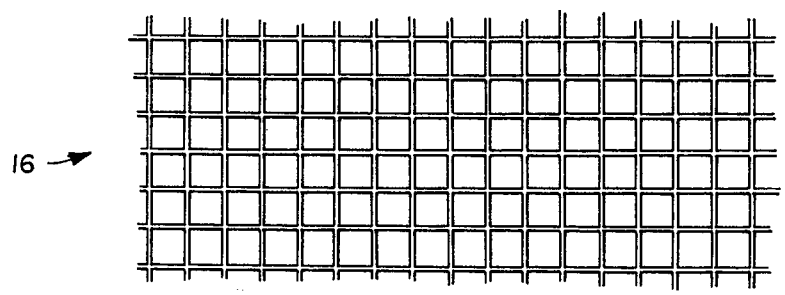
FIG. 2 is a fragmentary top plan view of the screen used in the manufacture of this grass product.

With reference to FIG. 1, a preferred embodiment of an improved grass product 10 of this invention is disclosed which is substantially protected or free from insect infestation such as by grubs or the like. As is well known, some species of flying insects, such as European Chafers and Japanese Beetles, burrow approximately 2 to 8 inches below the surface of the ground, depending upon the moisture and temperature of the ground, to lay their eggs. The eggs hatch to form larvae or grubs which feed on the plant roots, particularly the roots of grass plants, thereby killing the plants. When the grubs are mature, they move near the surface of the ground, change into flying adult beetles, and leave the ground. After mating, the female insects burrow into the ground to lay their eggs which hatch and form the larval stage of the next generation of the insects.

The improved grass product 10 of this invention prevents the insects from burrowing into the soil to lay their eggs. The eggs hatch into grubs which in the larval stage, attach or eat the grass roots causing the grass plants to die.

With reference to FIG. 1, the grass product 10 of this invention comprises a lower layer 12 of rooting material such as sod where an existing lawn or grassland is to be grub-proofed, or any suitable plant producing soil fortified by minerals and fertilizer where a new lawn or grassland is to be produced. Grass seeds 14 are planted in the sod or rooting material 12 and covered by a screen 16 placed on layer 12. Screen 16 and lower layer 12 are then covered by an upper layer 18 of rooting material such as plant producing soil. The grass blades 20 in the sod or formed by germination of the seeds travel upwardly through screen 16 and upper layer 18, and the grass roots 22 travel downwardly into lower layer 12 to form a grass product 10, which will be free from subsequent attack by grubs, except those presently existing in lower layer 12.

In the case of an existing grassland, the grass should first be cut as short as possible, the grass clippings removed and the sod dethatched as by thorough raking or by the use of a dethatching machine. Any bare spots should be preferably raked to loosen the soil and then seeded. If necessary, or desired, the existing grassland can be treated with an insecticide to kill any grubs presently in the soil. The screen 16 is preferably formed as a single unit from any suitable nondegradable material such as plastic, for example polyethylene, and as a predetermined mesh size preferably ranging between ⅛ to ¼ inch. The mesh prevents insects, such as European Chafers and Japanese Beetles, from passing from upper layer 18 into lower layer 12 where the soil conditions such as moisture and temperature are proper for them to lay their eggs. The mesh also prevents any residual grubs or larvae in lower layer 12 from burrowing up to the surface of layer 18 as they change from the larval stage to the flying insect stage. Although a mesh size of ⅛ to ¼ inch is preferred, the only limitation on the mesh size is that it be sufficiently large to permit the grass blade to pass through the mesh in its travel upwardly through the screen, and small enough to prevent the insects to pass through the mesh.

The invention has been described in detail with particular reference to a preferred embodiment, but it will be understood that variations and modifications can be effected within the spirit and scope of the invention as described.

What is claimed is:

1. A method for establishing a grass land in which the grass roots are protected from root-feeding grubs hatched from eggs laid by insects such as European Chafers and Japanese Beetles comprising:
    preparing a lower layer of rooting material which may contain grass seed;
    covering said lower layer with a nondegradable screen having a predetermined mesh size for preventing insects larger than said predetermined mesh size from passing through said screen into said lower layer to lay eggs, and residual grubs hatched from eggs in said lower layer from burrowing from said lower layer through said upper layer to form insects; and
    distributing an upper layer of rooting material over said screen whereby, upon germination of said grass seeds, the grass blades travel upwardly through said upper layer and the grass roots travel downwardly into said lower layer in a direction away from said screen.

2. The method of claim 1 wherein said mesh size is substantially ⅛ inch, and the lower surface of said screen lies substantially in one plane, and said grass seeds and roots formed by said grass seeds lie below said one plane.

3. A method for protecting an existing grassland containing grass roots from root-feeding grubs hatched from eggs laid by insects such as European Chafers and Japanese Beetles comprising:
    cutting the grass on the grassland as short as possible;
    dethatching the grassland to remove all grass clippings and dead grass;
    covering the grassland with a nondegradable screen having a predetermined mesh size; and
    distributing an upper layer of rooting material over said screen whereby insects larger than said predetermined mesh size are prevented from passing through said upper layer and said screen into the roots of said grassland to lay eggs which hatch into grubs which eat said grass roots, and residual grubs hatched from eggs in said grassland are prevented from passing through said screen and said upper layer to change into insects.

4. The method of claim 3 wherein said mesh size is substantially ⅛, and the lower surface of said screen lies substantially in one plane, and said grass roots lie below said one plane.

* * * * *